US009637922B1

(12) United States Patent
Cook et al.

(10) Patent No.: US 9,637,922 B1
(45) Date of Patent: May 2, 2017

(54) COLLAPSIBLE TRUSS

(71) Applicant: TomCat USA, Inc., Knoxville, TN (US)

(72) Inventors: David Dayne Cook, Knoxville, TN (US); William Scott Johnson, New Market, TN (US)

(73) Assignee: TomCat USA, Inc., Knoxville, TN (US)

( * ) Notice: Subject to any disclaimer, the term of this patent is extended or adjusted under 35 U.S.C. 154(b) by 0 days.

(21) Appl. No.: 14/885,948

(22) Filed: Oct. 16, 2015

(51) Int. Cl.
*E04C 3/08* (2006.01)
*E04B 1/343* (2006.01)
*E04B 1/19* (2006.01)
*E04B 1/344* (2006.01)
*E04H 12/18* (2006.01)
*E04H 12/10* (2006.01)

(52) U.S. Cl.
CPC .............. *E04C 3/08* (2013.01); *E04B 1/1903* (2013.01); *E04B 1/344* (2013.01); *E04B 1/34357* (2013.01); *E04B 1/34384* (2013.01); *E04H 12/10* (2013.01); *E04H 12/187* (2013.01)

(58) Field of Classification Search
CPC ... E04H 12/10; E04H 12/187; E04B 1/34357; E04B 1/1903; E04B 1/34384; E04B 1/344; E04B 1/343; E04C 3/005; E04C 3/08
See application file for complete search history.

(56) References Cited

U.S. PATENT DOCUMENTS

| | | | | |
|---|---|---|---|---|
| 5,228,258 A * | 7/1993 | Onoda | ..................... | B64G 9/00 343/915 |
| 6,076,770 A * | 6/2000 | Nygren | ..................... | B64G 9/00 244/159.5 |
| 6,321,501 B1 * | 11/2001 | Ignash | ..................... | E04C 3/005 52/641 |
| 2010/0064624 A1* | 3/2010 | Dodd | ..................... | E04C 3/005 52/646 |
| 2010/0181738 A1* | 7/2010 | Gross | ..................... | E04C 3/005 280/79.11 |
| 2011/0308189 A1* | 12/2011 | Daas | ..................... | B66C 23/70 52/646 |
| 2012/0110946 A1* | 5/2012 | Daas | ..................... | E04H 12/10 52/646 |

* cited by examiner

*Primary Examiner* — Adriana Figueroa
*Assistant Examiner* — Jessie Fonseca
(74) *Attorney, Agent, or Firm* — Slater Matsil, LLP

(57) ABSTRACT

A collapsible truss and method that is particularly suitable for staging and lighting, for shows, performances and other events. This evolved and novel modular truss can be collapsed to a significantly smaller size (i.e. increased density), and consequently requires significantly less space for storage and transportation. Further, in addition to the advantage of rapid assembly from collapsed parts to a full truss, the modular construction of the truss provides cost effective repair of this truss over traditional rigid welded trusses by simple replacement of damaged parts.

20 Claims, 9 Drawing Sheets

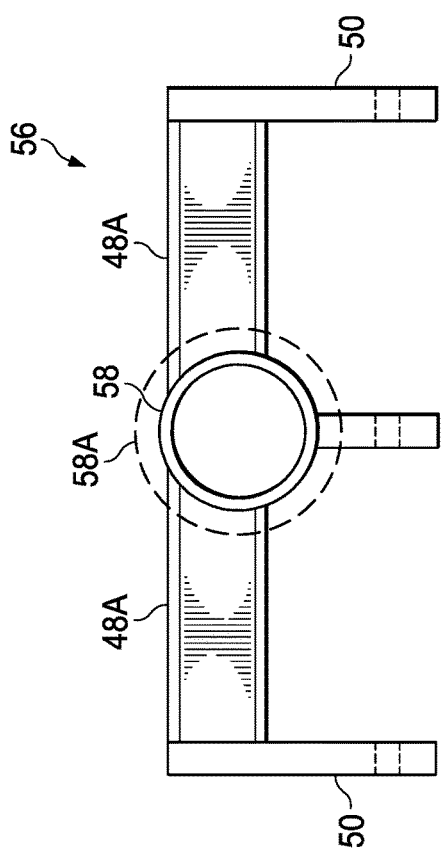
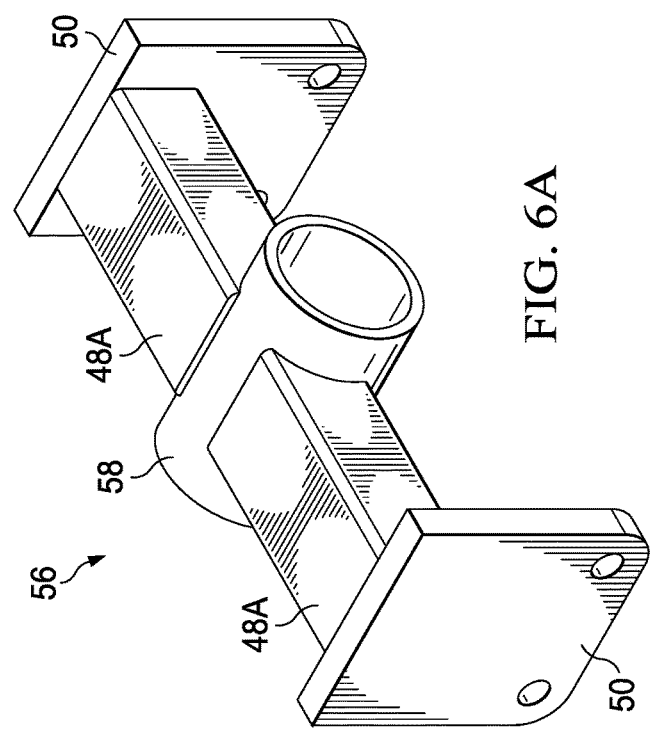
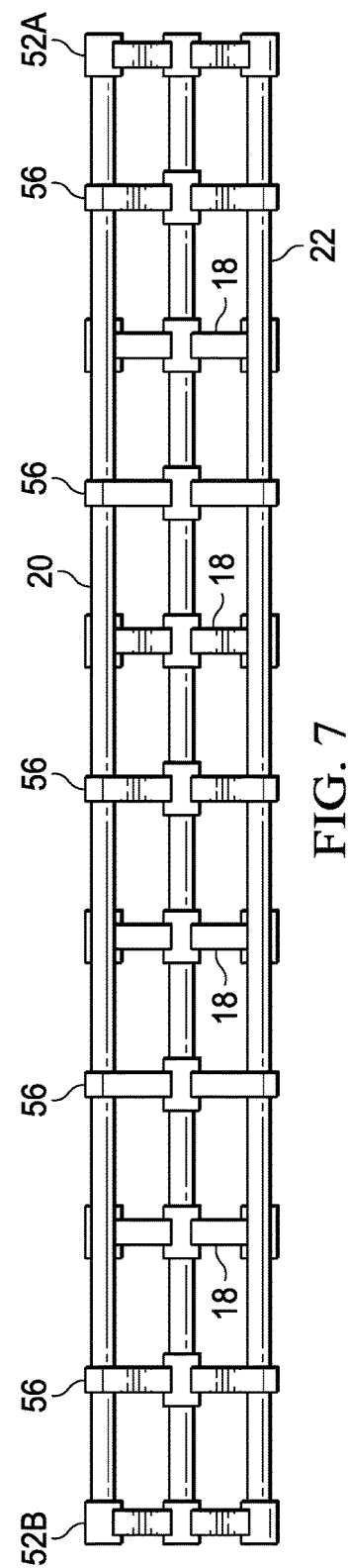
FIG. 6A
FIG. 6B
FIG. 7

COLLAPSIBLE TRUSS

TECHNICAL FIELD

This invention relates generally to the field of staging and lighting platform trusses and support systems and more particularly to a unique and modular collapsible truss that can be quickly assembled and disassembled for storage and transport. It is especially suitable for use with the temporary platforms and staging used for shows, performances and special events.

BACKGROUND

Although both temporary and permanent staging and lighting trusses and platforms have been used throughout the world for several decades, the storage and/or transporting of the presently available rigid and welded trusses and platforms results in high costs and other challenges due to the large volume (i.e. very low density) and size of these elongated rigid trusses. Furthermore, special event stages or platforms constructed with presently available permanently rigid trusses or components may present additional challenges, including required modification of various and different components of the truss, or the required use of unusual one-of-a-kind components. These modifications or use of different components may challenge the integrity of the platform. The present invention alleviates many of the disadvantages of assembling, storing or transporting a typical and even a special event stage by providing an easily assembled (and disassembled) truss that is robust and allows great flexibility during assembly of a staging platform without compromising the integrity of the staging platform.

SUMMARY

The present invention comprises a collapsible truss base unit that is compact and easy to store and transport, and a multiplicity of elongated chord members, such as aluminum pipe. To be used the truss base unit is expanded and the independent and separate chord members are threaded through and connected to the truss base units with quick release pins to form a robust and rigid elongated truss.

According to a preferred embodiment, the collapsible truss base unit has first and second truss end caps, where each of the first and second truss end caps comprise a primary portion and a secondary portion. The primary portion and the secondary portion of each of the truss end caps are rigidly connected together, such as by being welded or being formed from a rigid material, such as for example, aluminum or other metal. The primary portion of each truss end cap also has at least two connection points, such as for example first and second sleeves. Even though for most applications, two connection points are preferable, it will be appreciated that, if required, more than two connecting points could be used. In a preferred embodiment, two sleeves having a selected cross-section are used and are spaced a selected distance apart and each of the two sleeves receives and is connected to a chord member. The secondary portion of each truss end cap has at least one secondary connection or sleeve for securing or connecting a third chord member. However, rather than just one sleeve in the secondary portion, the preferred embodiment will also include two sleeves spaced apart the same distance as the sleeves in the primary portion and that has the same selected cross-section. Further, to provide a more stable condition when in the collapsed state, the sleeves in the primary portion of each truss end cap preferably will be longer than the sleeves in the secondary portion. However, longer primary sleeves are not required.

The collapsible truss base unit further includes at least one primary sliding unit that has at least first and second sliding parallel sleeves that define a similar cross-section as the cross-section of the sleeves in the primary portion of the truss end caps where sleeves are used as the connecting points so as to provide a sliding fit. The primary sliding parallel sleeve units are also made of a rigid material such as aluminum or other metal, such that they are rigidly connected together and spaced apart the same selected distance as the sleeves or connecting points on the primary portion of the truss end caps.

Also included are secondary sliding units. There is at least one more secondary sliding unit than there are primary sliding units. Each of the secondary sliding units has at least one sliding sleeve, but preferable two. The sleeve(s) of the secondary sliding units define a similar cross-section as the cross-section of the sleeve(s) in the secondary portion of each truss end cap so as to provide a sliding fit. The secondary sliding sleeve units, similar to the primary sliding units, are made of a rigid material such as aluminum or other metal, so that they are rigidly connected together. Where there is more than one secondary sleeve, the sleeve(s) are parallel to each other and spaced apart the same distance as the sleeve(s) or connecting points on the secondary portion of the truss end caps.

The truss end caps and the primary and secondary units are all connected together by a multiplicity of elongated connecting link units of a selected length. A first group of the elongated connecting link units have a first end pivotally connected to each of the first and second truss end caps at the primary connections. A second end of each of the first group of connecting link units is pivotally connected to one of the secondary sliding units. Each one of a second group of the elongated connecting link units is pivotally connected between one of the primary sliding units and one of the secondary sliding units to form the collapsible truss base. In the preferred embodiment, the elongated connecting link units comprise two parallel connecting links.

To form a rigid truss, the collapsible truss base unit is expanded and the elongated chord members are then threaded through the sleeves of the primary and secondary sliding units and secured to the connecting points on the two truss end caps.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6A and 6B are an isometric view and a front view respectively of the secondary sliding units of the three chord embodiment;

FIG. 7 is a top view of an assembled three chord truss;

DETAILED DESCRIPTION OF ILLUSTRATIVE EMBODIMENTS

The making and using of the various embodiments are discussed in detail below. It should be appreciated, however, that the present invention provides many applicable inventive concepts that can be embodied in a wide variety of specific contexts. The specific embodiments discussed are merely illustrative of specific ways to make and use the invention and do not limit the scope of the invention.

Figure 1:
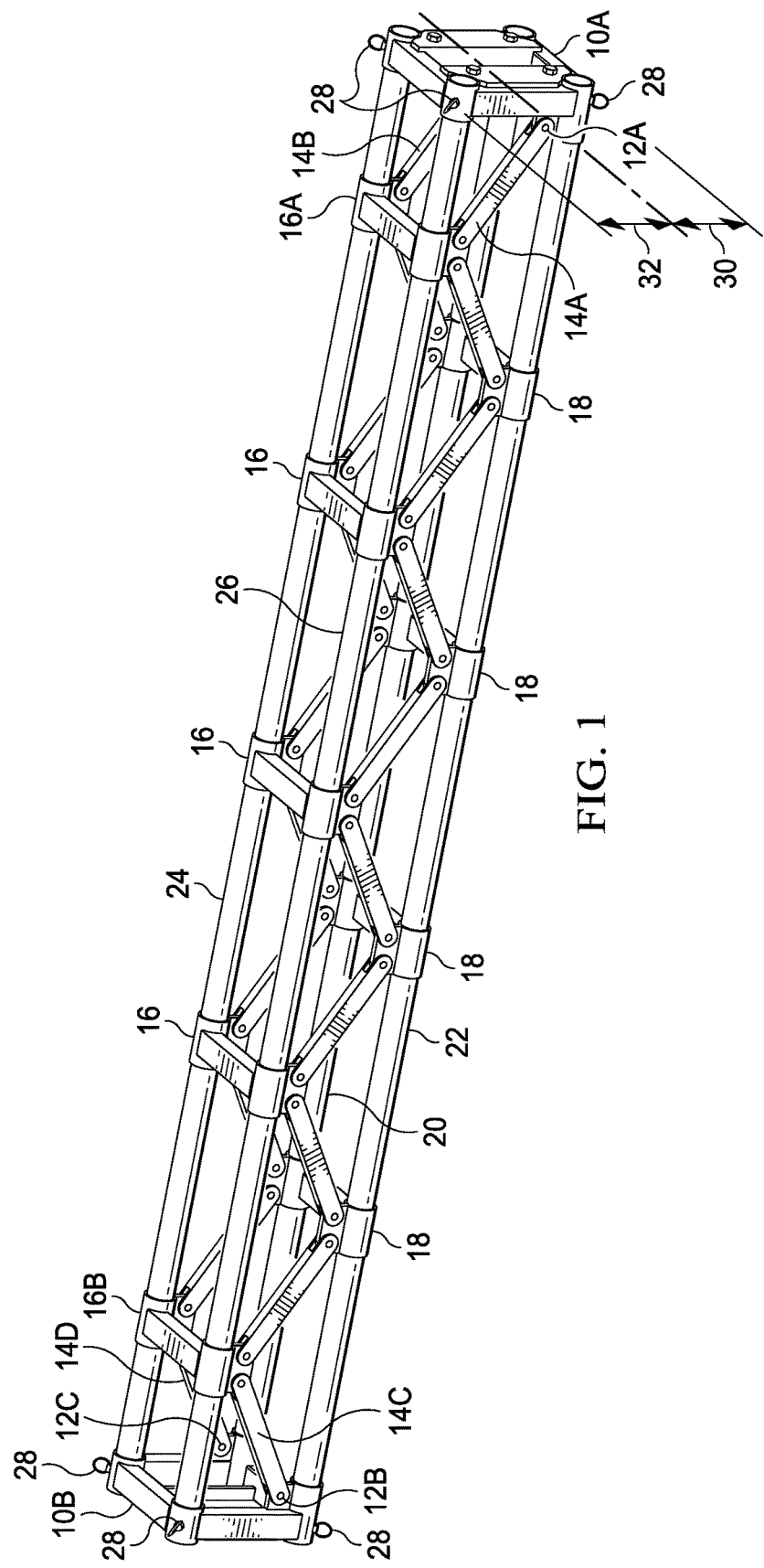
FIG. 1 is an isometric view of the expanded and assembled collapsible truss of this invention.

Referring now to FIG. 1 there is shown an isometric view of the expanded and assembled preferred embodiment of the collapsible truss of this invention. As shown, there is a first truss end cap 10A and a second truss end cap 10B. Each of the truss end caps 10A and 10B have a primary portion that includes the two connecting points 12A and 12D (connecting point 12D is not visible in FIG. 1) and a secondary portion that includes connecting points 12B and 12C. Both of the truss end caps 10A and 10B are pivotally connected, one each at two of the four connecting points 12A, 12B, 12C and 12D to a first end of a first group of connecting link units 14A, 14B, 14C and 14D. A second end of each of the four connecting link units 14A, 14B, 14C and 14D is pivotally connected to secondary sliding units 16A and 16B. A second group of sixteen connecting link units are pivotally connected between each of the remaining three secondary sliding units 16 and the four primary sliding units 18. It should be noted that in the embodiments of FIGS. 1 and 2, the connecting link units are comprised of two connecting links. However, it will be appreciated that connecting link units could use a single connecting link rather than two. As shown, each of the primary sliding units 18 have two parallel sleeves that provide a sliding fit with the two elongated chord members 20 and 22. In a similar manner, all of the five secondary sliding units 16, 16A and 16B provide a sliding fit with the two elongated chord members 24 and 26.

To assemble the collapsible rigid and robust truss as shown in FIG. 1, the elongated chord members 20 and 22 extend from connections (connector sleeves) at the corners of the primary portion of truss end cap 10A through the sleeves of the four primary sliding units 18 to connections (connector sleeves) at the corners of the primary portion of truss end cap 10B. Similarly, the elongated chord members 24 and 26 extend from connections (connector sleeves) at the corners of the secondary portion of truss end cap 10A through the sleeves of the five secondary sliding units 16, 16A and 16B to the connections (connector sleeves) at the corners of the secondary portion of truss end cap 10B. In this preferred embodiment, the connections at the corners of the truss end caps are also sleeves that provide a sliding fit with the associated chord member. Each of the four chord members 20, 22, 24 and 26 are secured firmly in place by quick release pins 28 that extends through aligned holes in the connector sleeves of the two truss end caps and the associated chord member. In the preferred embodiment, the elongated chord members are pipes and have a round cross-section. However it will be appreciated that the chords could have other shaped cross-sections, such as square or rectangular.

Figure 2:
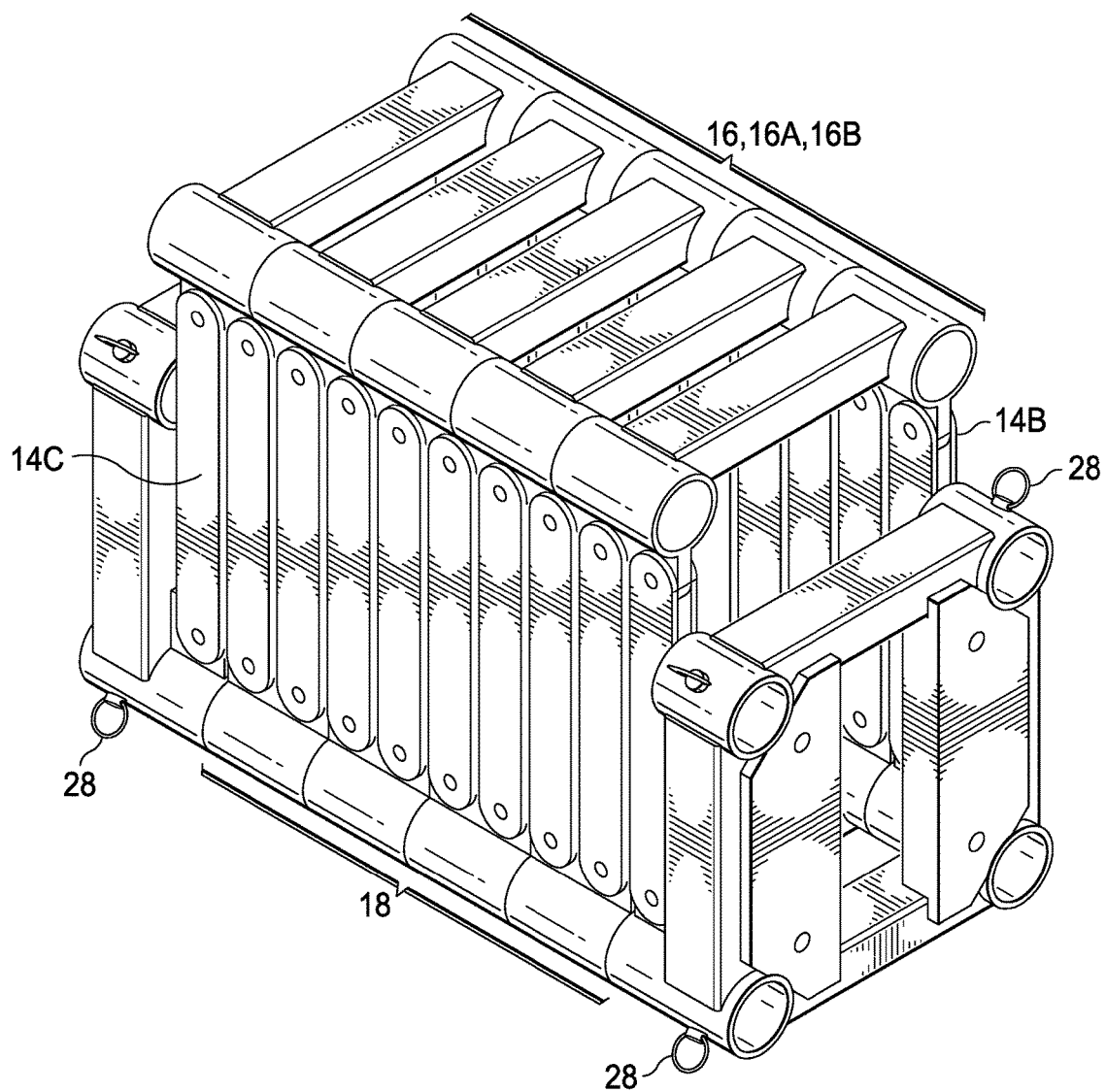
FIG. 2 is an isometric view of the assembled and collapsed truss base unit of this invention with the elongated chord members removed.

To disassemble the collapsible truss for storage or transporting, the four quick release pins 28 securing the chords inside the connector sleeves of the truss end caps 10A and 10B are simply removed and the four chord members pulled completely out of their associated connector sleeves and sliding sleeves. The two truss end caps 10A and 10B are then pushed toward each other until all five of the secondary sliding units 16, 16A and 16B are in contact with each other, and all of the four primary sliding units are in contact with each other. It should also be noted that to achieve a more stable collapsed truss base unit, such as shown in FIG. 2 the four connector sleeves in the primary portion of the two truss end caps 10A and 10B are longer than the four connector sleeves in the secondary portion of the two truss end caps. The extra length allows the two outside primary sliding sleeves to be in contact with their associated primary connector sleeves on the two truss end caps.

Figure 3A:
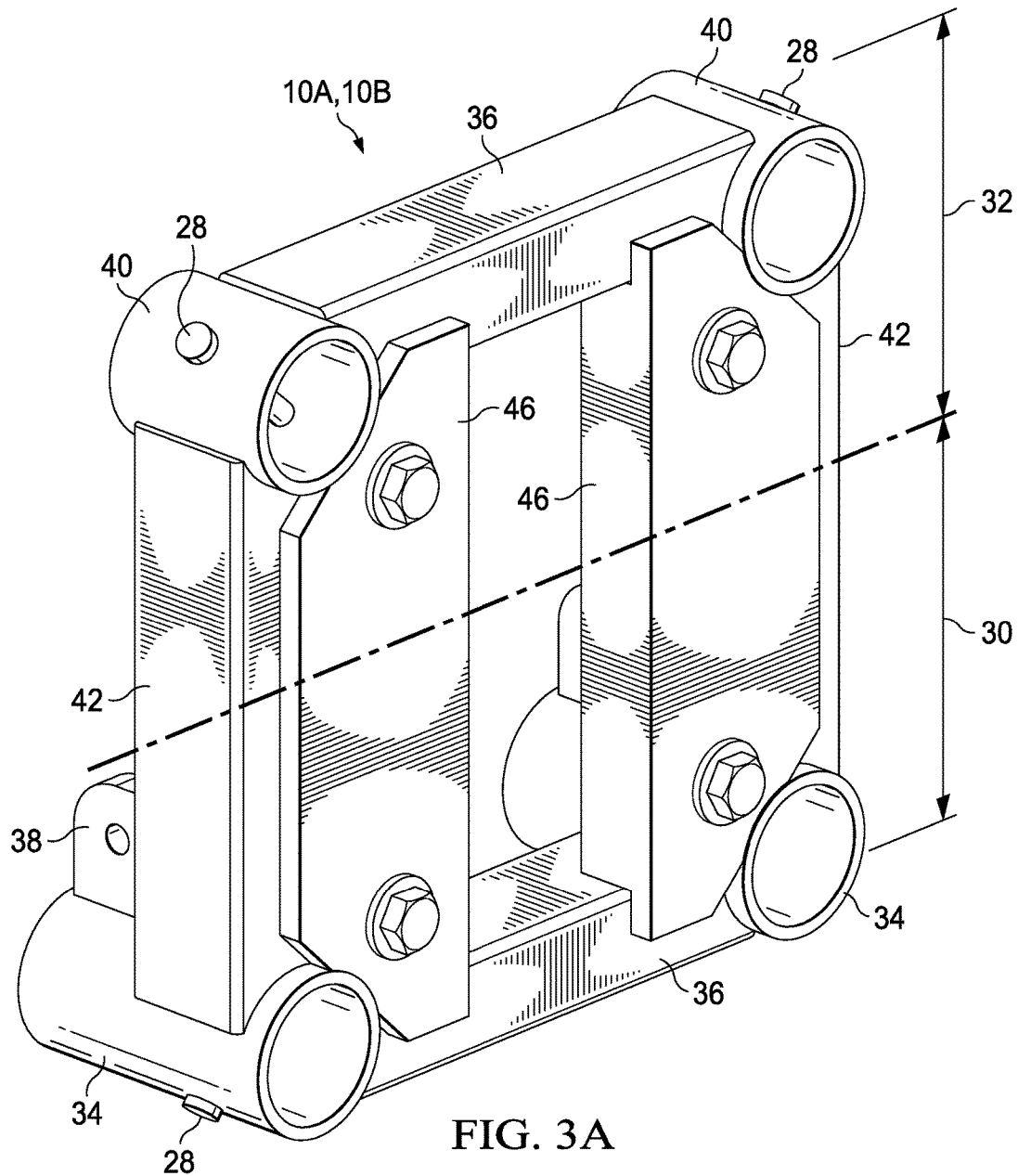
FIGS. 3A and 3B are an isometric front view, an isometric rear view and front view respectively of a truss end cap of the preferred embodiment of this invention.
Figure 3B:
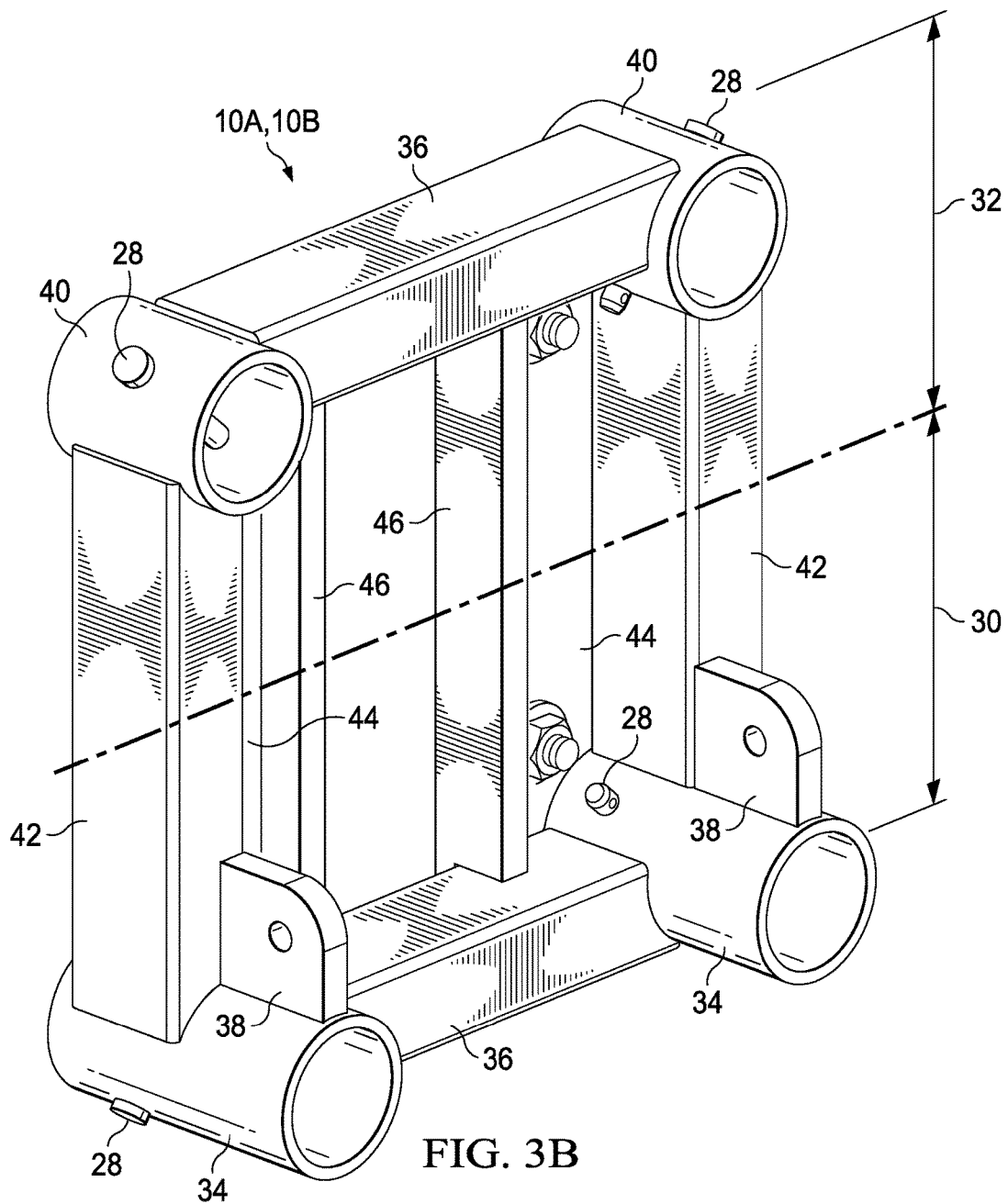

Referring now to FIGS. 3A and 3B, there is shown a front and back isometric view of the truss end caps used in the preferred embodiment of the invention. As shown, and for explanation purposes only, each of the truss end caps 10A and 10B are discussed as having a primary portion 30 and a secondary portion 32. Primary portion 30 of the two truss end caps includes a primary pair of parallel sleeves 34 rigidly connected together at a selected distance apart, such as by welding, by a support member 36. Rigidly attached, to each primary sleeve 34 is a connecting tab 38 for pivotally connecting one of the connecting link units 14A, 14B, 14C and 14D. Secondary portion 32 of the truss end caps is similar to the primary portion 30 and includes two parallel secondary sleeves 40 rigidly connected together the same selected distance apart as the two primary sleeves by a second support member 36. In this preferred embodiment, the primary sleeves 34 are longer than the secondary sleeves 40 so as to provide more stability to the truss base unit when it is in its collapsed state, however, the primary sleeves and the secondary have the same cross-section. The primary portion 30 and the secondary portion 32 are connected together by support members 42 which may have the same length or a different length than support members 36. There is also a plate member 44 with bolt holes. These plate members 44 are rigidly attached to each of the support members 42 to provide connecting structure so that two or more of the collapsible trusses of this invention can be connected together. As is more clearly shown in FIG. 3A a pair of reinforcement plates 46 may be bolted to the plate members 44.

Figure 4A:
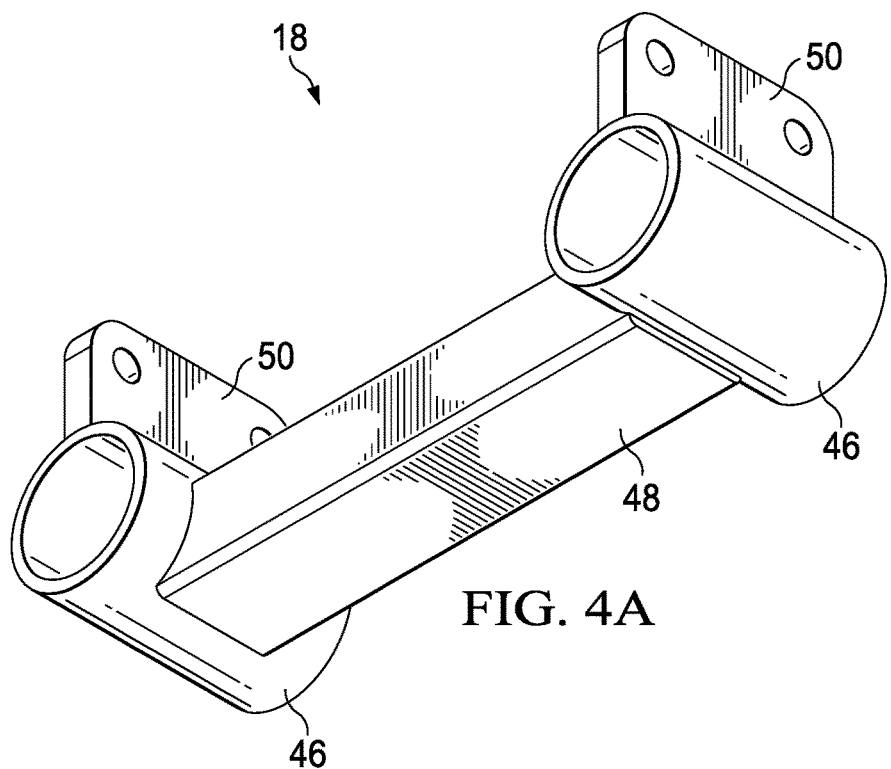
FIGS. 4A and 4B are isometric views of the primary and secondary sliding units of the preferred embodiment of this invention.
Figure 4B:
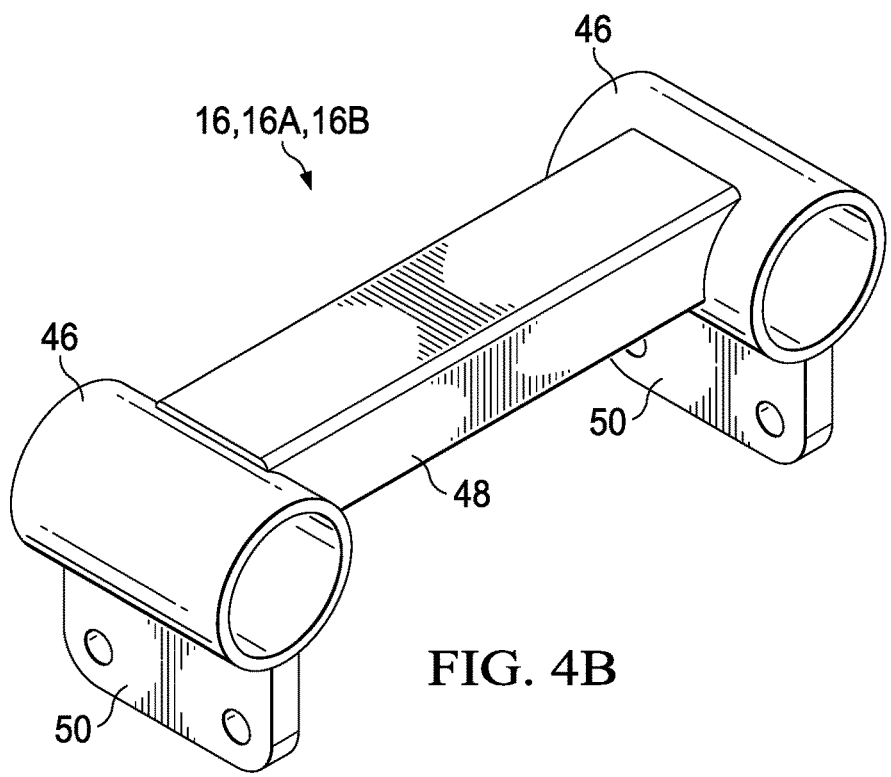
Figure 4C:
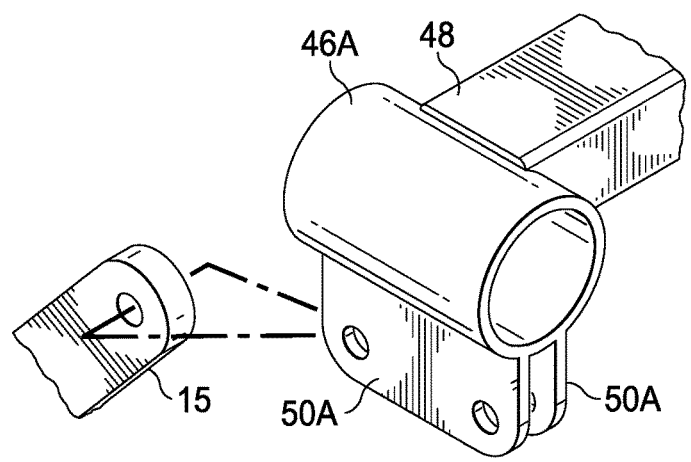
FIG. 4C shows another embodiment of the sliding sleeve units.
Figure 5:
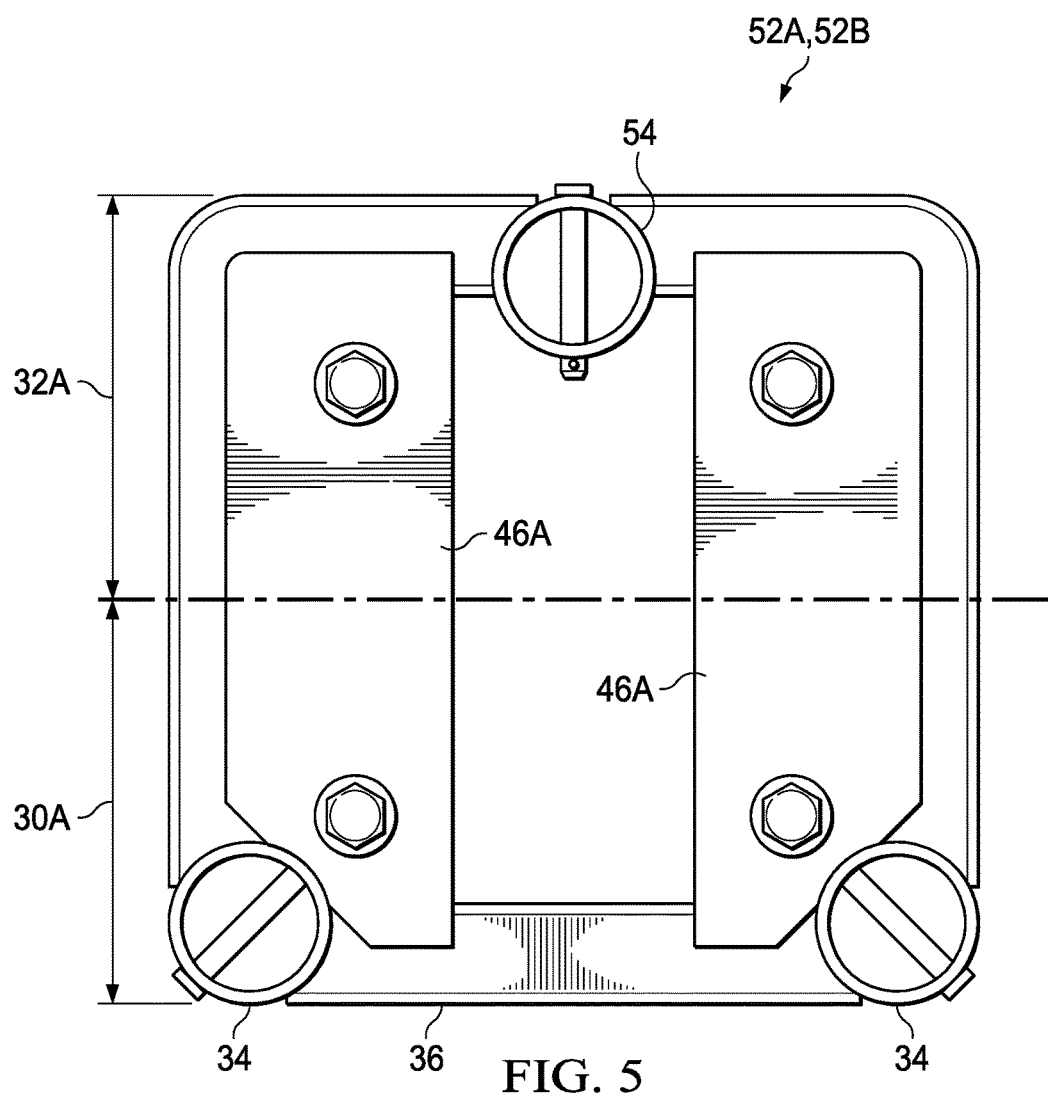
FIG. 5 is a front view of a truss end cap for a three chord embodiment.

FIG. 4A is an isometric view of a primary sliding unit 18 of one preferred embodiment of this invention. As shown, primary sliding unit comprises a pair of sleeves 46 rigidly connected together by connecting arm 48. Sleeves 46 provides a sliding fit with the chord members 24 and 26. Also connected to each of the sleeves 46 is connector plate 50 which has two apertures for pivotally connecting the connecting link units also as discussed above. FIG. 4B is an isometric view of the secondary sliding units 16, 16A and 16B. In the preferred embodiment of FIGS. 4A and 4B, the secondary sliding units are identical to the primary sliding units. However, it will be appreciated that the cross-sectional diameter of the secondary sleeves could be different than the diameter of the primary sleeves so as to accommodate chord members 24 and 26 if they were selected to have a different diameter than chord members 20 and 22. FIG. 4C illustrates another embodiment of the sliding sleeves 18 (or 16) wherein the sleeve 46A and two connector plates 50A are extruded as a single unit. As shown by dashed lines, the connector link units 15 comprise a single connecting link that is connected between the two connector plates 50A.

FIGS. 5, 6A, 6B and 7 illustrate an embodiment of the invention having three chord members rather than four. Where the various components of this three chord embodiment are the same as components of the four chord preferred embodiment, the reference numbers to these components will remain the same. As show, in FIG. 5 there is illustrated a front view of truss end caps 52A and 52B for the three chord embodiment. Further as shown in the figure, the primary portion 30 of the end caps is the same as discussed with respect to the preferred embodiment, and includes two sleeves 34. However, the secondary portion 32A comprises only a single sleeve 54. As shown in FIGS. 6A and 6B the secondary sliding members 56 also only have a single sleeve 58 and the connector plates 50 are attached to the connector arm 48A rather than to the two sleeves. Also as shown in FIG. 7B, the sleeve 58 may have a different diameter as illustrated by the dashed circle 58A.

Figure 8:
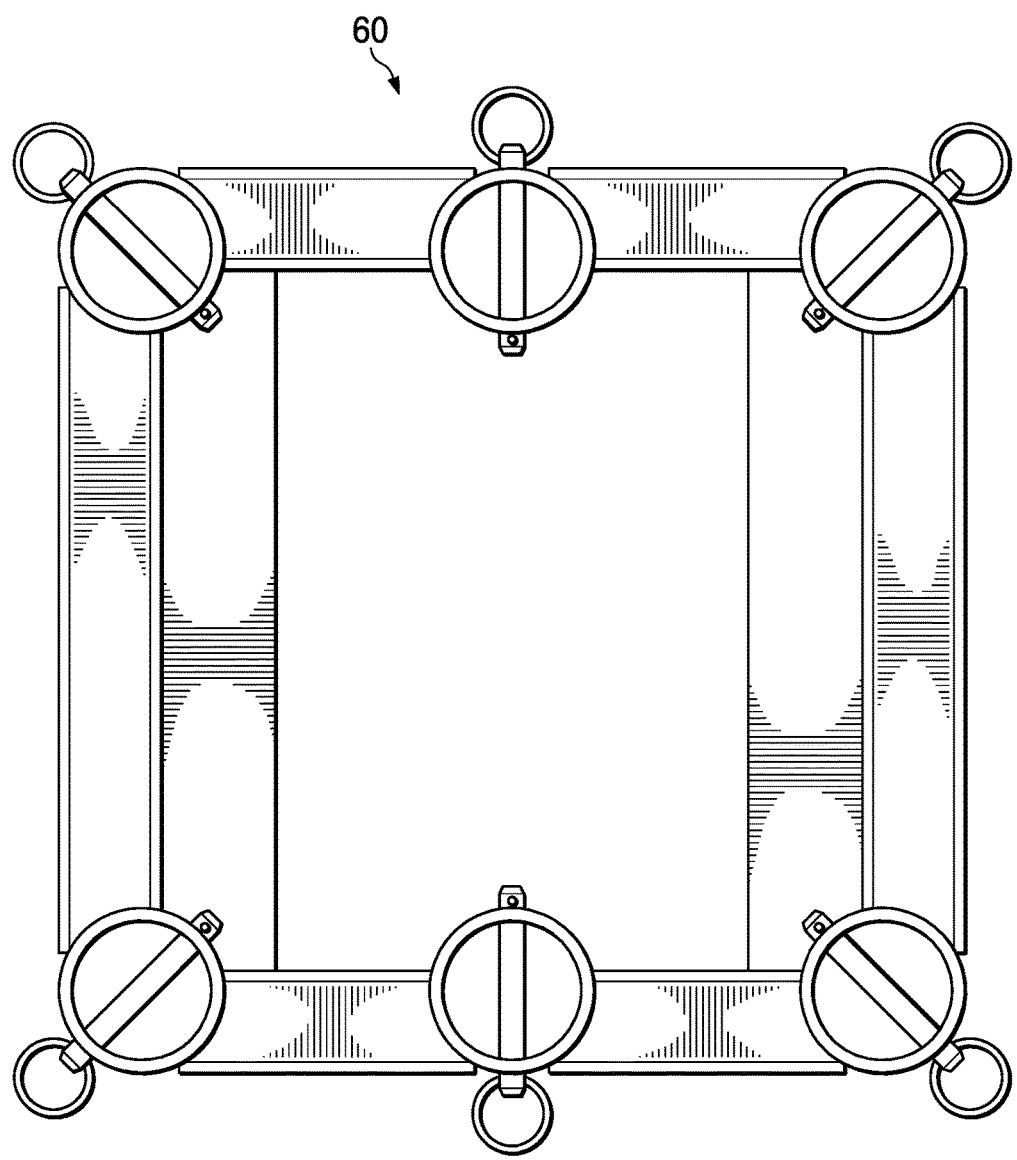
FIG. 8 is a front view of a truss end cap of a six chord embodiment.
Figure 9A:
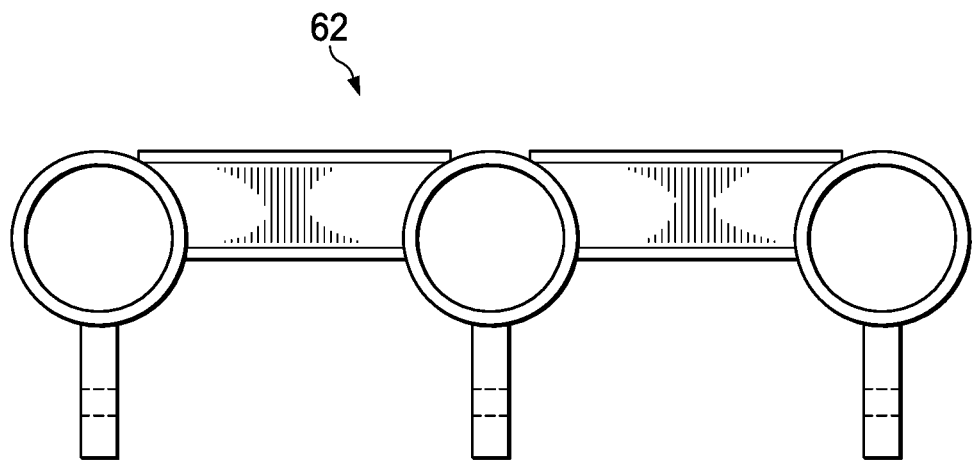
FIGS. 9A and 9B are a front view and a top view respectively of the primary and secondary sliding units of the six chord embodiment of FIG. 8.
Figure 9B:
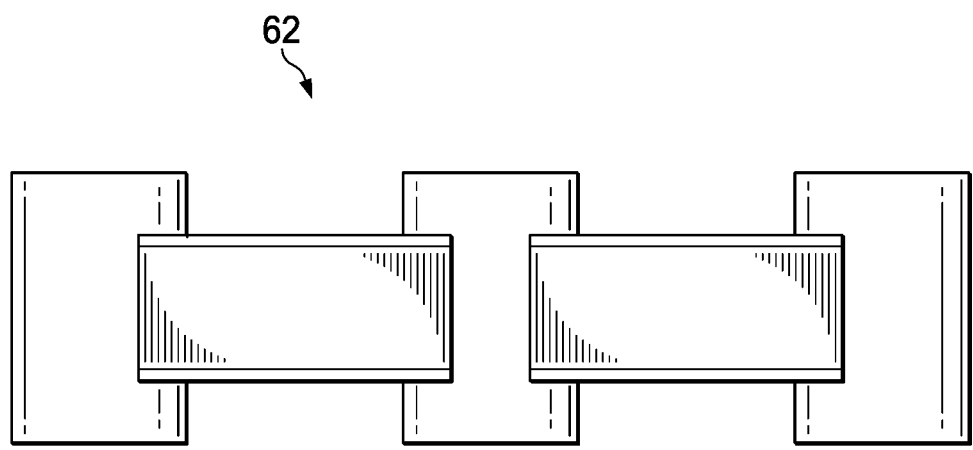

FIGS. 8, 9A and 9B illustrate a front view of the truss end plate 60, and front and top views respectively of the primary and secondary sliding units 62 of a six chord embodiment of the invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A truss base unit for cooperating with at least three separate and removable chord members to form an elongated truss when said at least three separate and removable chord members are installed, and said truss base unit collapsible when said at least three chord members are removed, said collapsible truss base unit comprising:
   first and second truss end caps, each of said first and second truss end caps comprising a primary portion and a secondary portion, said primary portion having first and second primary connections rigidly spaced a first selected distance apart adapted to secure a first and a second removable chord member, said secondary portion having at least one secondary connection adapted to secure at least a third removable chord member, said primary portion and said secondary portion rigidly connected together at a fixed distance apart;
   a multiplicity of primary sliding units, each of said primary sliding units having at least first and second sliding parallel sleeve, each defining a first selected cross-section and said parallel sleeves rigidly connected together and rigidly spaced apart said first selected distance;
   a multiplicity of secondary sliding units, each of said secondary sliding units having at least one sliding sleeve defining a second selected cross-section, each at least one sliding sleeve being parallel to said first and second sliding parallel sleeves; and
   a multiplicity of elongated connecting link units of a selected length, first ones of said connecting link units having a first end pivotally connected to each of said first and second truss end caps adjacent said first and second primary connections, and a second end pivotally connected to one of said secondary sliding units, and each one of the remaining elongated connecting link units pivotally connected between said primary sliding units and said secondary sliding units to form said collapsible truss base unit.

2. The truss base unit of claim 1 wherein said at least three chord members are not present, and said first and second primary connections of said first and second truss end caps are in proximate contact with one of said primary sliding units, and each of said secondary sliding units are in proximate contact with another one of said secondary sliding units such that said collapsible truss base unit is collapsed.

3. An elongated truss comprising the collapsible truss base unit of claim 1 and further comprising said at least three installed elongated chord members, a first end of a first one and a second one of said at least three elongated chord members extending from and being connected to said first and second primary connections of said first truss end cap, further extending through said sleeves of said primary sliding units with a sliding fit and connected to said first and second primary connections of said second truss end cap; and
   said third one of said at least three elongated chord members extending from and connected to said secondary connection of said secondary portion of said first truss end caps further extending through said sleeves of said secondary sliding units with a sliding fit and connected to said secondary connection of said secondary portion of said second truss end cap such that an elongated truss is formed.

4. The elongated truss of claim 3, wherein said first and second primary connections and said secondary connection comprise first and second primary sleeves and a secondary sleeve, said first and second primary sleeves defining said first selected cross-section shape for receiving said first and second chord members, each locked in place by a quick release pin, and said secondary sleeve defining said second selected cross-section for receiving said third chord member and being locked in place by a quick release pin.

5. The elongated truss of claim 4, wherein said primary sleeves of said first and second truss end caps are longer than said secondary sleeve and said primary sleeves are in contact with one of said primary sliding units, and each of the sleeves of said secondary sliding units are in contact with another one of said sleeves of said secondary sliding units such that said collapsible truss base unit is collapsed.

6. The elongated truss of claim 4, wherein said first selected cross-section and said second selected cross-section are the same.

7. The elongated truss of claim 1 wherein said first and second primary connections comprise first and second primary sleeves, said first and second primary sleeves defining said first selected cross-section for receiving said first and second chord members and said first and second chord members being locked in place by a quick release pin, and said at least one secondary connection of said secondary portion comprises first and second secondary sleeves spaced said selected distance apart and each defining said second selected cross-section for receiving said third chord member and a fourth chord member, and each being locked in place by a quick release pin.

8. The elongated truss of claim 7 wherein said first selected cross-section and said second selected cross-section are the same.

9. The elongated truss of claim 7, wherein said first and second selected cross-sections are round.

10. The elongated truss of claim 7, wherein said first and second selected cross-sections are square.

11. The elongated truss of claim 7, wherein at least a portion of said multiplicity of connecting link units comprise two connecting links.

12. A collapsible elongated truss comprising:
a truss base unit for cooperating with at least four separate and removable chord members to form said elongated truss when said at least four separate and removable chord members are installed, and said truss base unit collapsible when said at least four separate and removable chord members are removed, said collapsible truss base unit comprising first and second truss end caps, each of said first and second truss end caps comprising a primary portion and a secondary portion, said primary portion having first and second primary connections spaced a selected and fixed distance apart adapted to secure a first and a second one of said at least four separate and removable chord members, said secondary portion having first and second secondary connections spaced said selected and fixed distance apart adapted to secure a third and a fourth one of said at least four separate and removable secondary chord members, and said primary portion and said secondary portion rigidly connected together at a fixed distance apart;
a multiplicity of primary sliding units, each of said primary sliding units having at least first and second sliding parallel sleeves, each defining a first selected cross-section and said parallel sleeves rigidly connected together and spaced apart said selected and fixed distance;
a multiplicity of secondary sliding units, each of said secondary sliding units having at least first and second sliding sleeves, each defining a second selected cross-section and spaced said selected and fixed distance apart, said first and second sliding sleeves of said secondary sliding units parallel to said first and second sliding parallel sleeves of said primary sliding units; and
a multiplicity of elongated connecting link units of a selected length, first ones of said connecting link units having a first end pivotally connected to each of said first and second truss end caps at said first and second primary connections and a second end pivotally connected to one of said secondary sliding units, and each one of the remaining elongated connecting link units pivotally connected between said primary sliding units and said secondary sliding units to form said collapsible truss base unit;
said first and second ones of said at least four separate and removable chord members extending from and being connected to said first and second primary connections of said first truss end cap, and further extending through said sleeves of said primary sliding units with a sliding fit and connected to said first and second primary connections of said second truss end cap; and
said third and fourth ones of said at least four separate and removable chord members extending from and connected to said first and second connections of said secondary portion of said first truss end caps and further extending through said sleeves of said secondary sliding units with a sliding fit and connected to said first and second connections of said secondary portion of said second truss end cap such that an elongated truss is formed.

13. The collapsible elongated truss of claim 12, wherein said first and second primary connections and said first and second secondary connections comprise first and second primary sleeves and first and second secondary sleeves, said first and second primary sleeves defining said first selected cross-section shape for receiving said first and second primary chord members, each locked in place by a quick release pin, and said first and second secondary sleeves defining said second selected cross-section for receiving said first and second secondary chord members, each locked in place by a quick release pin.

14. The collapsible elongated truss of claim 13, wherein said first selected cross-section and said second selected cross-section are the same.

15. The collapsible elongated truss of claim 13, wherein said first and second selected cross-sections are round.

16. The collapsible elongated truss of claim 12, wherein at least a portion of said multiplicity of connecting link units comprise two connecting links.

17. The collapsible elongated truss of claim 12, wherein each of said primary and secondary sliding units comprise at least one sliding sleeve extruded with a pair of connector plates as a single unit, and said elongated connecting link units comprise a single connecting link pivotally connected between said pair of connector plates.

18. The collapsible elongated truss of claim 13, wherein said primary portion of said first and second truss end caps comprise first, second and third primary sleeves; said secondary portion of said first and second truss end caps comprise first, second and third secondary sleeves; each of said first and second primary sliding units comprising first, second and third sliding parallel sleeves and each of said first and second secondary sliding units comprising first, second and third sliding parallel sleeves; said first and second primary elongated chord members comprising first, second and third primary elongated chord members; and said first and second secondary elongated chord members comprising first, second and third secondary elongated chord members.

19. A collapsible truss base unit comprising:
first and second truss end caps, each of said first and second truss end caps comprising a primary portion and a secondary portion, said primary portion having first and second primary sleeves defining a first selected cross-section and spaced a first selected distance apart for securing a first and a second chord member locked in place by a quick release pin, said secondary portion having at least one secondary sleeve defining a second cross-section for securing a third chord member, said primary portion and said secondary portion rigidly connected together;
a multiplicity of primary sliding units, each of said primary sliding units having at least first and second sliding parallel sleeves, each defining a first selected cross-section and said parallel sleeves rigidly connected together and spaced apart said first selected distance;
a multiplicity of secondary sliding units, each of said secondary sliding units having at least one sliding sleeve defining a second selected cross-section, said at least one sliding sleeve being parallel to said first and second sliding parallel sleeves; and a multiplicity of elongated connecting link units of a selected length, first ones of said connecting link units having a first end pivotally connected to each of said first and second truss end caps having first and second primary connections and a second end pivotally connected to one of said secondary sliding units, and each one of the remaining elongated connecting link units pivotally connected between said primary sliding units and said secondary sliding units to form said collapsible truss base unit.

20. A collapsible elongated truss comprising:

first and second truss end caps, each of said first and second truss end caps comprising a primary portion and a secondary portion, said primary portion of said first and second truss end caps having first and second primary sleeves spaced a selected distance apart, and for securing a first and a second chord member, said secondary portion of said first and second truss end caps having first and second secondary sleeves spaced said selected distance apart, and for securing a third and a fourth chord member, and said primary portion and said secondary portion of each end cap rigidly connected together;

a multiplicity of primary sliding units, each of said primary sliding units having first and second sliding parallel sleeves defining a first selected cross-section and said parallel sleeves rigidly connected together and spaced apart said selected distance;

a multiplicity of secondary sliding units, each of said secondary sliding units having first and second sliding sleeves defining a second selected cross-section and spaced said selected distance apart, said first and second sliding sleeves of said secondary sliding units parallel to said first and second sliding parallel sleeves of said primary sliding units; and a multiplicity of elongated connecting link units of a selected length, first ones of said connecting link units having a first end pivotally connected to each of said first and second truss end caps at said first and second primary sleeves and a second end pivotally connected to one of said secondary sliding units, and each one of the remaining elongated connecting link units pivotally connected between said primary sliding units and said secondary sliding units to form a collapsible truss base;

said first and second chord members extending from and being connected and locked in place, by a quick release pin, to said first and second primary sleeves of said first truss end cap, and further extending through said sleeves of said primary sliding units with a sliding fit and connected and locked in place, by a quick release pin, to said first and second primary sleeves of said second truss end cap; and said third and fourth chord members extending from and connected and locked in place, by a quick release pin, to said first and second secondary sleeves of said secondary portion of said first truss end cap and further extending through said sleeves of said secondary sliding units with a sliding fit and connected and locked in place, by a quick release pin, to said first and second sleeves of said secondary portion of said second truss end cap such that an elongated truss is formed.

\* \* \* \* \*

UNITED STATES PATENT AND TRADEMARK OFFICE
CERTIFICATE OF CORRECTION

PATENT NO. : 9,637,922 B1
APPLICATION NO. : 14/885948
DATED : May 2, 2017
INVENTOR(S) : David Dayne Cook Page 1 of 1

It is certified that error appears in the above-identified patent and that said Letters Patent is hereby corrected as shown below:

In Column 5, Line 61, Claim 1, delete "sleeve" and insert --sleeves--.

Signed and Sealed this
Sixth Day of March, 2018

Andrei Iancu
*Director of the United States Patent and Trademark Office*